United States Patent
Kinouchi et al.

(10) Patent No.: US 6,805,217 B2
(45) Date of Patent: Oct. 19, 2004

(54) POWER TRANSMISSION MECHANISM OF FOUR-WHEEL DRIVE VEHICLE

(75) Inventors: Sosuke Kinouchi, Kakogawa (JP); Izumi Takagi, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/645,663

(22) Filed: Aug. 22, 2003

(65) Prior Publication Data

US 2004/0060760 A1 Apr. 1, 2004

(30) Foreign Application Priority Data

Aug. 28, 2002 (JP) ..................................... P2002-248844

(51) Int. Cl.[7] .............................................. B60K 17/34
(52) U.S. Cl. ...................................... 180/233; 180/245
(58) Field of Search ................................. 180/233, 245, 180/246, 248, 241, 243; 475/222

(56) References Cited

U.S. PATENT DOCUMENTS

| | | | | |
|---|---|---|---|---|
| 2,861,479 A | * | 11/1958 | Muller | 475/222 |
| 3,773,130 A | * | 11/1973 | Mueller | 180/24.09 |
| 5,107,951 A | * | 4/1992 | Kawamura | 180/248 |
| 6,076,623 A | * | 6/2000 | Teraoka et al. | 180/233 |
| 6,491,126 B1 | * | 12/2002 | Robison et al. | 180/233 |
| 2002/0003058 A1 | * | 1/2002 | Hori et al. | 180/248 |

FOREIGN PATENT DOCUMENTS

JP        2001-301477        10/2001

* cited by examiner

Primary Examiner—Lesley D. Morris
Assistant Examiner—Tony Winner
(74) Attorney, Agent, or Firm—Wenderoth, Lind & Ponack, L.L.P.

(57) ABSTRACT

A power transmitting mechanism for a four-wheel drive vehicle. In the mechanism, a power unit is mounted between a front wheel and a rear wheel; each of a differential gear for front wheels and a final speed reducer for rear wheels locates centrally relative to a width of a vehicle body; a power takeoff drive shaft of the power unit is offset from a centerline of the vehicle body; each of an input shaft of the differential gear and a propeller shaft for the front wheels is parallel to the centerline thereof and is coaxial with the power takeoff drive shaft; an input shaft of the final speed reducer tilts towards the power takeoff drive shaft relative to the centerline; a propeller shaft for rear wheels locates on an axis which is coaxial with the input shaft of the final speed reducer.

6 Claims, 6 Drawing Sheets

POWER TRANSMISSION MECHANISM OF FOUR-WHEEL DRIVE VEHICLE

BACKGROUND OF THE INVENTION

1. Field of the Invention

The present invention generally relates to a power transmission mechanism of a four-wheel drive vehicle, in which a power unit, including an engine and a transmission, is mounted between front wheels and rear wheels, in which a front end part of a power takeoff shaft of the transmission is connected to an input shaft of a differential gear for the front wheels through a propeller shaft, and in which a rear end part of the power takeoff shaft is connected to an input shaft of a final reduction gear for the rear wheels through a propeller shaft, and particularly relates to the power transmission mechanism which is suitable for the four-wheel drive vehicle having a four-wheel independent suspension system.

2. Description of the Related Art

As a power transmission mechanism employed for the aforementioned type of the four-wheel drive vehicle, the mechanism which is disclosed in Japanese Laid-Open Patent Publication No. 2001-301477, has been known. That is, as shown in FIG. 6, each of the right-and-left front wheels 101 and right-and-left rear wheels 102, is suspended independently, by a suspension arm 103 which can swing up and down, and by a shock absorber (not shown). A power unit P, having an engine and a transmission, is mounted between the front wheel 101 and the rear wheel 102.

Each of the differential gear 106 for the front wheels and final reduction gear 107 for the rear wheels, is mounted centrally with respect to a width of a body of the vehicle, and a power takeoff shaft 110 of the transmission is offset to be on the left side of a center line C of the width of the body of the vehicle with respect to a direction in which the vehicle runs forward, and extends in parallel with the centerline C. The front end part of the power takeoff shaft 110 is connected to an input shaft 114 of the differential gear 106 for the front wheels 101 through a propeller shaft 112, which is arranged generally in parallel with the centerline C. On the other hand, the rear end part of the power takeoff shaft 110 is connected to an input shaft 118 of the final reduction gear 107 for the rear wheels 103 through a propeller shaft 115, which tilts with respect to the centerline C.

The power unit P is mounted slightly rearwards relative to a center between the front wheel 101 and the rear wheel 102. In the arrangement, the distance between the final reduction gear 107 and the rear end part of the power takeoff shaft 110, is shorter than the distance between the differential gear 106 and the front end part of the power takeoff shaft 110.

The input shaft 118 of the final reduction gear 107, is arranged in parallel with the centerline C. The front end part of the propeller shaft 115 is coupled to the rear end part of the power takeoff shaft 110 through a universal joint 120 with a predetermined tilt angle therebetween. On the other hand, the rear end part of the propeller shaft 115 is coupled to the input shaft 118 of the final reduction gear 107 through a universal joint 121 with a predetermined tilt angle therebetween, too.

In the arrangement, the two universal joints 120 and 121 locating at the front and rear end parts of the propeller shaft 115, are non-constant velocity universal joints, respectively. However, since both of the universal joints 120 and 121 are constructed symmetrical to each other, the changes in their rotational speeds during one rotation, are cancelled to each other. Therefore, the rotation is transmitted between the drive takeoff shaft 110 and the input shaft 118, generally at an equal speed.

In the four-wheel drive vehicle having a four-wheel independent suspension, each of the differential gear 106 and the final reduction gear 107, is mounted at a center with respect to the width of the vehicle, as aforementioned. With the arrangement, it is possible to make length of each of the suspension arms (A-shaped arms) 103 equal in a direction of right and left, and also possible to make each thereof longer. Namely, with the arrangement, the width of the vehicle is prevented from growing in size, and a suspension stroke thereof is secured to be long while suppressing any change in tread so that comfortable ride of the vehicle is realized.

However, in the power transmission mechanism, the drive shaft 110 and the input shaft 118 are connected by the propeller shaft 115, tilted, via the two universal joints 120, 121, as explained above. That is, according to the arrangement, not only crossed axes angle between the propeller shaft 115 and the drive shaft 110 which are connected to each other via one 120 of the two universal joints and between the propeller shaft 115 and the input shaft 118 which are connected to each other via the other 121 of the two universal joints, become greater, but also the rotational speed of the power transmission mechanism is changed twice through the pair of universal joints 120 and 121. Therefore, with the arrangement, it is difficult to reduce the loss of driving power which is transmitted to the rear wheels 102. Also, the arrangement necessitates a counter-measure against short life of the universal joints 120 and 121.

Also, according to the arrangement, the power unit P is mounted a bit backward (or rearward) with respect to a center between the front wheel 101 and the rear wheel 102. Therefore, the distance between the power takeoff shaft 110 and the input shaft 118, in which the propeller shaft 115 is mounted, becomes inevitably smaller. Therefore, the aforementioned crossed axes angle of the propeller shaft becomes larger.

SUMMARY OF THE INVENTION

Therefore, it is an object of the present invention to provide a power transmission mechanism of a four-wheel drive vehicle, in which a loss of a driving power that is transmitted to rear wheels of the vehicle is reduced and a joint part (or coupling part) in the power transmission mechanism is simplified in construction while maintaining a good ride feeling and a compactness of the vehicle.

In accomplishing the above and other objects, there is provided a power transmission mechanism of a four-wheel drive vehicle, comprising: a power unit which has an engine and a transmission, in which the power unit is provided between front wheels and rear wheels; a power takeoff shaft of the transmission, in which the power takeoff shaft is provided generally in parallel and in offset with a centerline relative to a width of a body of the vehicle; a differential gear for the front wheels, in which the differential gear is provided centrally relative to the width of the body, and in which the differential gear has an input shaft provided in parallel with the centerline and provided coaxially with the power takeoff shaft; a front propeller shaft for connecting between a front part of the power takeoff shaft and a rear part of the input shaft of the differential gear; a final reduction gear for the rear wheels, in which the final reduction gear is provided centrally relative to the width of the body of the vehicle, in which the final reduction gear has an input shaft provided such that a front part of the input shaft tilts toward the power takeoff shaft with respect to the centerline; and a rear propeller shaft for connecting between a rear part of the power takeoff shaft and the front part of the input shaft of the final reduction gear, wherein the front propeller shaft is arranged so as to be coaxial with the power takeoff shaft and the input shaft of the differential gear, and wherein the rear propeller shaft is arranged so as to be coaxial with the input shaft of the final reduction gear.

According to the mechanism, since the front part of the input shaft of the final reduction gear tilts toward the power takeoff shaft with respect to the centerline of the vehicle, and since the propeller shaft for the rear wheels is generally coaxial with the input shaft of the final reduction gear, not only the downsizing, weight saving and simplification of the joint part (or coupling part) can be realized, but also the loss of driving power that is transmitted to the rear wheels is reduced while the abrasion of the joint part is effectively prevented. In addition, the right and left suspension arms for the front and rear wheels can be set not only to be equal to each other, but also to be longer, respectively. Thereby, the comfortable ride and the compactness in the direction of width of the body of the vehicle are maintained.

In the above mechanism, preferably, the power unit is provided between the front wheels and the rear wheels such that a total length of the rear propeller shaft and the input shaft for the final reduction gear is longer than a total length of the front propeller shaft and the input shaft for the differential gear.

According to the mechanism, the angle of inclination, or tilt, of the rear propeller shaft becomes smaller. Therefore, with the mechanism, the loss of driving power that is transmitted to the rear wheels is effectively reduced, and the assemblage thereof is facilitated.

In the mechanism, preferably, there is further provided a braking device which is mounted on the input shaft of the final reduction gear.

With the mechanism, the space in front of the final reduction gear for the rear wheels, can be made full use of for mounting the braking device. Especially, in a case that the power unit is provided between the front wheels and the rear wheels such that the distance between the power unit and the final reduction gear is secured to be relatively greater, it is possible to secure enough space for mounting the brake device. Also, with the mechanism that the braking device is positioned in front of the final reduction gear, the effect to cool down the braking device is enhanced, by getting the air coming from the fore of the vehicle while it is running.

In the mechanism, preferably, the braking device is a wet multiple-disk braking device.

With the mechanism, it is possible to make compact the dimension of the braking device in the direction of radius, especially the dimension in the direction of up and down thereof. Consequently, with the mechanism, enough space is secured between the braking device and the ground, and the braking device is maintained at a high location, as a minimum height, with respect to the ground level.

In the mechanism, preferably, the wet multiple-disk braking device has a casing which is integrated with a casing which the final reduction gear has.

With the mechanism, the casing of the braking device can be simplified. Also, with the mechanism, the same lubricant (or engine oil) can be employed, commonly, as the lubricant circulating in the final reduction gear and as the lubricant circulating in the braking device. Therefore, the maintenance of the lubrication system in the power transmission mechanism can be minimized.

BRIEF DESCRIPTION OF THE DRAWINGS

The above and other objects and features of the present invention will become clear from the following description taken in conjunction with the preferred embodiment thereof with reference to the accompanying drawings.

DETAILED DESCRIPTION OF THE PREFERRED EMBODIMENT

Figure 1:
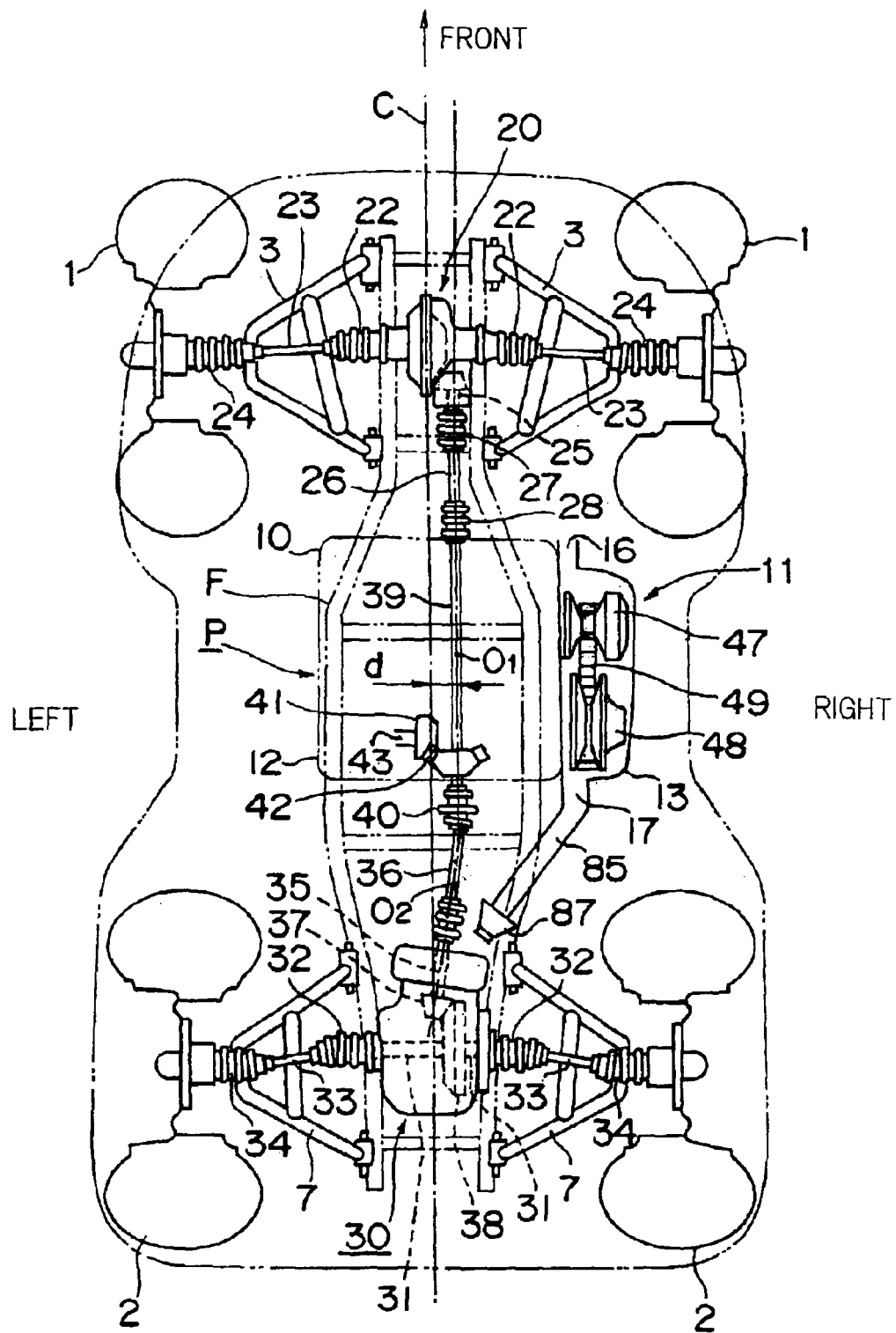
FIG. 1 is a plan view showing a four-wheel drive vehicle in which a power transmission mechanism according to a preferred embodiment of the present invention, is mounted.

Before a description of a preferred embodiment of the present invention proceeds, it is to be noted that like or corresponding parts are designated by like reference numerals throughout the accompanying drawings.

With reference to FIGS. 1 through 5, the description is made below upon a straddle type all-terrain four-wheel drive independent suspension vehicle to which a power transmission mechanism according to the preferred embodiment of the present invention applies. Hereinafter, the straddle type all-terrain four-wheel drive independent suspension vehicle is simply referred to as a "vehicle".
(Layout of Four-wheel Drive Vehicle)

Figure 2:
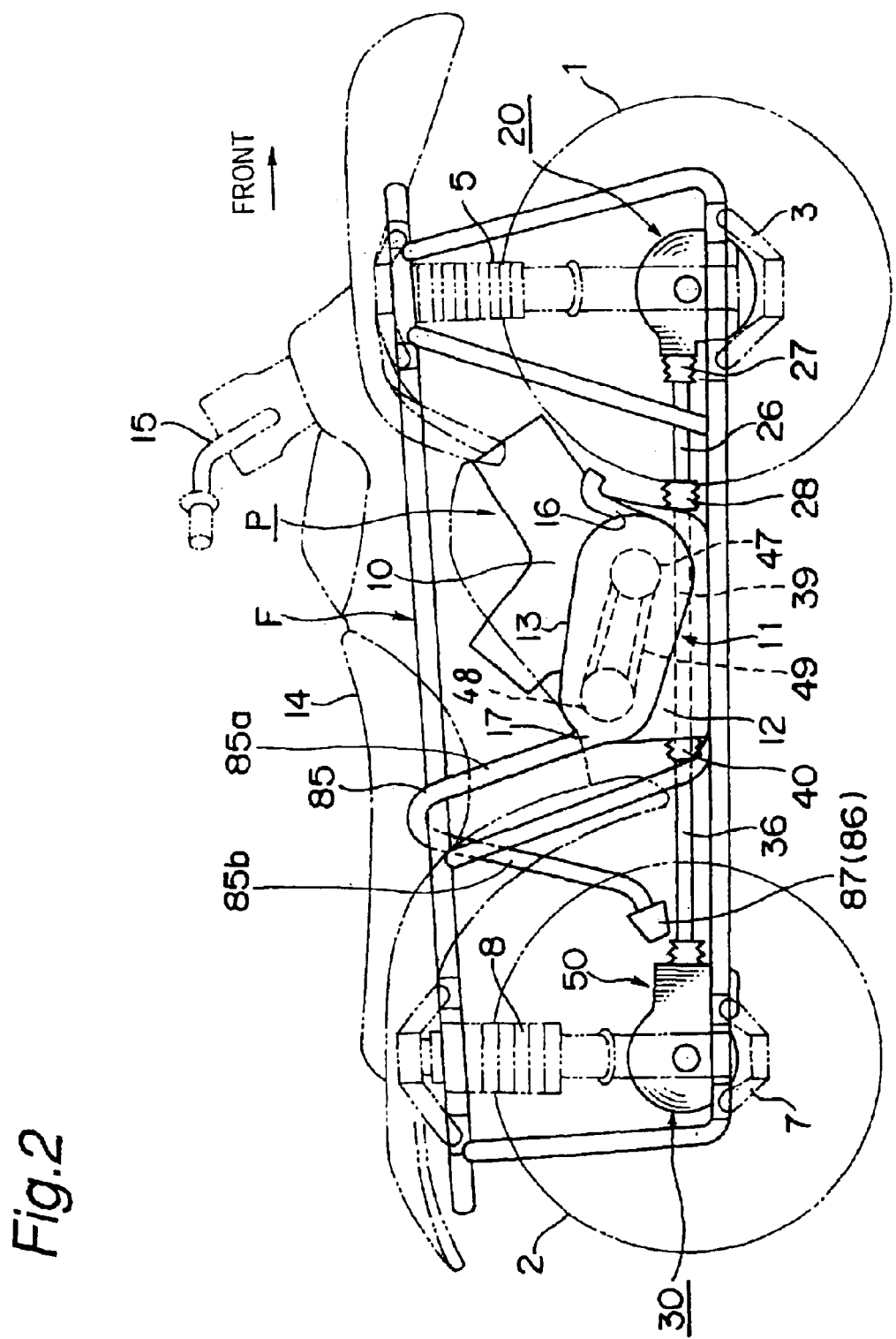
FIG. 2 is a right side view of the four-wheel drive vehicle of FIG. 1.

FIG. 1 is a plan view showing the vehicle, and FIG. 2 is a right side view of the vehicle of FIG. 1. As shown in FIG. 2, the vehicle has a frame F which extends in a direction of front and rear of a body of the vehicle (i.e. backward and forward), left and right front wheels 1 which are mounted on the frame at a front end part of the frame F, and a suspension mechanism which supports each of the front wheels 1 so as to be able to swing up and down, independently. The suspension mechanism has a pair of front suspension arms 3, which extend on left and right sides from the frame F and which have lower and upper arms, respectively. The suspension mechanism also has a front shock absorber 5. In FIG. 2, only the lower suspension arm (or A-shaped arm) is shown.

Left and right rear wheels 2 are mounted on the frame F at a rear end part of the frame F, and a rear suspension mechanism supports each of the rear wheels 2 so as to be able to swing up and down, independently. The suspension mechanism has a pair of rear suspension arms 7 which extend on left and right sides from the frame F and have lower and upper arms, and has a rear shock absorber 8. In FIG. 2, only the lower suspension arm (or A-shaped suspension arm) is shown.

As shown in FIG. 1, between the front wheel 1 and the rear wheel 2, there are arranged a power unit P which has an engine 10, an automatic V-belt transmission 11, a gear transmission 12, and so on. The power unit P is arranged a bit forwards with respect to a center between the front wheel 1 and the rear wheel 2 in the direction of front and rear of the body of the vehicle. Furthermore, as shown in FIG. 1, there are provided a straddle type seat 14 which allows a rider to straddle thereon, and a steering handle 15, both of which are mounted on an upper part of the frame F.

As shown in FIG. 1, there is provided a differential gear 20 for the front wheels 1, centrally in the direction of width of the body of the vehicle, between the left and right front wheels 1. The differential gear 20 has left and right output shafts which extend in the direction of right and left of the body of the vehicle, and each of the output shafts is connected to one end part of each of left and right front wheel drive shafts 23, through a constant velocity universal joint 22. In the arrangement, the other end part of each of the front wheel drive shafts 23 is connected to each of left and right wheel shafts of the front wheels 1, through a constant velocity universal joint 24. The right and left front wheel drive shafts 23 are constructed to have equal length and are mounted generally symmetrically with respect to a centerline C of the body of the vehicle. The centerline C is a line which crosses a center between the left and right wheels and extends in the direction of the front and rear of the vehicle. Also, the left and right front suspension arms 3 are constructed to have equal length to each other and are mounted generally symmetrically with respect to the centerline C.

The differential gear 20 for the front wheels 1 has an input shaft 25 which is mounted in a position that is offset rightward relative to the centerline C, by a distance of "d" (i.e. the input shaft 25 is arranged on a horizontal axis O1 in FIG. 1), in which the input shaft 25 is positioned in parallel with the centerline C.

On the other hand, there is provided a final reduction gear 30 for the rear wheels 2, centrally in the direction of width of the body of the vehicle, between the left and right rear wheels 2. The final reduction gear 30 has left and right output shafts 31 which extend in the direction of right and left of the vehicle, each of the output shafts 31 is connected to one end part of each of left and right rear wheel drive shafts 33, through a constant velocity universal joint 32, and the other end part of each of the rear wheel drive shafts 33 is connected to each of rear wheel shafts of the rear wheels 2, through a constant velocity universal joint 34. The left and right rear wheel drive shafts 33 are constructed to have equal length to each other and are mounted generally symmetrically with respect to the centerline C. Also, the left and right rear suspension arms 7 are constructed to have equal length to each other and are mounted generally symmetrically with respect to the centerline C.

The final reduction gear 30 for the rear wheels 2 has an input shaft 35 having a front part and a rear part. The input shaft 35 is provided with a small bevel gear (pinion gear) 37 which is fixed to the rear part thereof, and the bevel gear 37 locates generally at a central part relative to the direction of the width of the body of the vehicle (i.e. locates generally on the centerline C). On the other hand, the input shaft 35 tilts rightwards from the rear part towards the front part with respect to the centerline C.

(Automatic V-belt Transmission)

There is arranged an automatic V-belt transmission 11 on a right side of the engine. The automatic V-belt transmission 11 has a drive pulley 47 which is coupled to a crankshaft, extended sideways, of the engine 1, a driven pulley 48 which is coupled to an input shaft of the gear transmission, and a V-belt 49 which extends between the drive pulley 47 and the driven pulley 48. The automatic V-belt transmission 11 operates in such a manner that a reduction ratio thereof changes automatically from a state of maximum reduction ratio upon starting the operation to a state of a low reduction ratio according to an increase of the engine speed, or in such a manner that the reduction ratio increases automatically, as the load from the side of the wheels 1 and 2 increases.

The automatic V-belt transmission 11 is covered by a belt cover 13 which has an air inlet hole 16 for cooling at its front part, and which has an air outlet hole 17 at its rear part. In the construction, outside air is taken in the air inlet hole 16 by an air sucking fan which is arranged on a rear side of the drive pulley 47, the air cools down the automatic V-belt transmission 11, and the air is discharged from the air outlet hole 17.

(Drive Power Transmission System for Transmitting Drive Power from Power Unit to Differential Gear for Front Wheel and to Final Reduction Gear for Rear Wheel)

A power takeoff shaft 39 of the power P unit is provided in a lower portion of the power unit P so as to extend backward and forward (i.e. in the direction of the front and rear of the vehicle) in parallel with the centerline C. The power takeoff shaft 39 is mounted on a right side of the centerline C, and it locates on the axis O1 which corresponds to the axis O1 of the input shaft 25 of the differential gear 20. The power takeoff shaft 39 is interlocked to an output shaft 43 of the gear transmission 12 through small and large bevel gears 41 and 42.

A front part of the power takeoff shaft 39 projects forwards from a front edge of the power unit P (i.e. front edge of the engine 10). A rear part of the input shaft 25 of the differential gear for the front wheels 1 and the front part of the power takeoff shaft 39 are connected to each other, with a front propeller shaft 26. The front propeller shaft 26 locates on the axis O1 which is coaxial with each of the input shaft 25 and the power takeoff shaft 39.

In the construction, a connection part between a front part of the front propeller shaft 26 and the input shaft 25, and a connection part between a rear part of the front propeller shaft 26 and the power takeoff shaft 39, are arranged on the same axis O1 as the axis of the three shafts 25, 26 and 39. Therefore, the connection parts are not composed of universal joints, but are composed of coaxial spline couplings 27, 28 which are simple in constitution.

Figure 3:
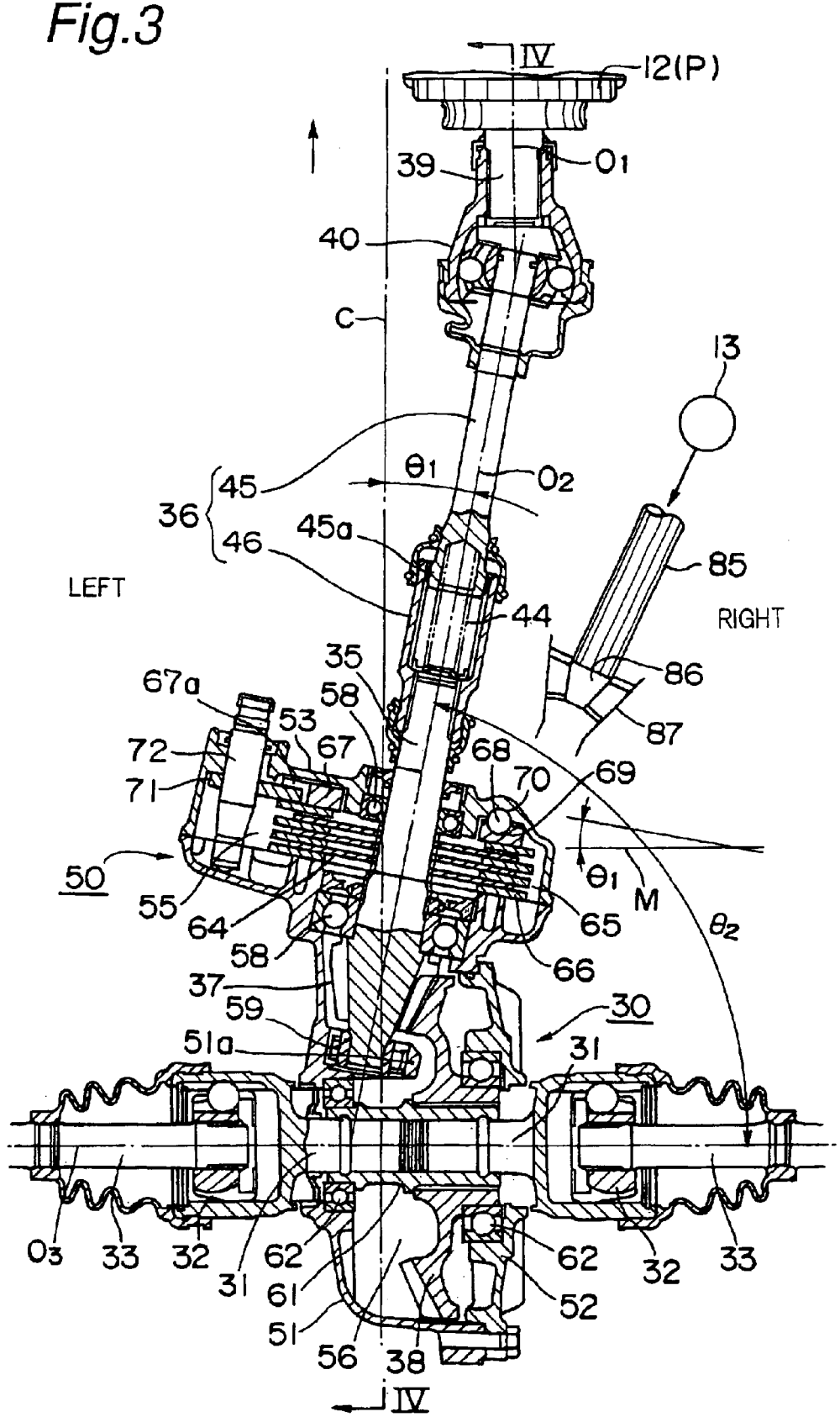
FIG. 3 is an enlarged view of a horizontal cross section showing a final reduction gear for a pair of rear wheels and a wet multiple-disk braking device which are employed for the four-wheel drive vehicle of FIG. 1.

FIG. 3 is an enlarged view of a horizontal cross section showing the power transmission mechanism for driving the rear wheels 2. As shown in the figure, a rear part of the power takeoff shaft 39 projects rearwards from a rear edge of the power unit P (a rear edge of the gear transmission 12). The rear part of the power takeoff shaft 39 is coupled to the tilted input shaft 35 of the final reduction gear 30, via a rear propeller shaft 36 for the rear wheels 2. As shown therein, the rear propeller shaft 36 tilts relative to the centerline C so as to be coaxial with the tilted input shaft 35.

The distance between a rear part of the power takeoff shaft 39 and the final reduction gear 30 in the direction of the front and rear of the vehicle is set to be longer than the distance between the front part of the power takeoff shaft 39 and the differential gear 20 (refer to FIG. 1). To be precise, the distance between a rear end of the power takeoff shaft 39 and a front end of the input shaft 35 of the final reduction gear 30 is set to be longer than the distance between a front end of the power takeoff shaft 39 and a rear end of the input shaft 25 of the differential gear 20 so that the rear propeller shaft 36 is longer than the front propeller shaft 26.

As aforementioned, the input shaft 35 of the final reduction gear 30 has the small bevel gear 37 which is positioned generally centrally with respect to the width of the body of the vehicle (i.e. generally on the centerline C), and the front part of the input shaft 35 tilts on the right hand side towards the front of the vehicle, with respect to the centerline C. In the embodiment, the angle θ1 of inclination of the input shaft 35 relative to the centerline C, is set to be 11 degrees, for example. In other words, the input shaft 35 inclines at an angle of 79 degrees (i.e. θ2=79 degrees), with respect to an axis O3 of a hollow shaft 61 for the rear wheels 2 to which the large bevel gear 38 is mounted.

The propeller shaft 36 tilts rightwards towards the front of the vehicle at the same angle θ1 as that of the input shaft 35 with respect to the centerline C, and the rear propeller shaft 36 is positioned on the same axis O2 which is the axis of the input shaft 35. The propeller shaft 36 has an intermediate shaft 45 which constitutes a front part of the propeller shaft 36 and has a hollow shaft 46 which constitutes a rear part thereof.

A front part of the intermediate shaft 45 is coupled to the rear part of the power takeoff shaft 39, through a constant velocity universal joint 40. The rear part of the intermediate shaft 45 has an outer spherical spline 45a, with which an inner spline formed on a front part of the hollow shaft 46 engages so as to able to move in the direction of the axis of the propeller shaft 36. With the construction, the propeller shaft 36, as a whole, can expand and contract in the direction of the axis O2, and at the same time a slight bending thereof can be absorbed in the spherical spline 45a.

The hollow shaft 46 has an inner spline in a rear end part, which engages with an outer spline of the input shaft 35. Between the intermediate shaft 45 and the hollow shaft 46, there is mounted a compressed coil spring 44, the biasing force of which all the time acts in the direction of keeping both of the shafts 45 and 46 apart from each other. The biasing force exerted on by the coil spring 44 prevents any play in the direction of the axis O2 from occurring inside the propeller shaft 36. Also, with the coil spring 44 and its operation, it is possible to mount the propeller shaft 36 without removing the final reduction gear 30 from the frame F.

(Final Reduction Gear for Rear Wheel and Brake Device)

As shown in FIG. 3, the final reduction gear 30 for the rear wheels 2, has the small bevel gear 37 and the large bevel gear 38 which meshes with the small bevel gear 37, as aforementioned. There is arranged a wet multiple-disk braking device 50 for the input shaft 35 which inclines rightwards forwards, also as aforementioned. A casing for the final reduction gear 30 and a casing for the braking device 50, are formed integrally to each other. The integrally formed casing has a housing 51 which surrounds both of the bevel gears 37 and 38, a right side cover 52 of the housing 51, and a brake cover 53 which is detachably attached to a front end part of the housing 51.

The input shaft 35 is rotatably supported by the brake cover 52 and the housing 51, through front and rear bearings 58 which are mounted inside a brake chamber 55. The small bevel gear 37 projects inside a speed reduction gear chamber 56, and its rear end part is supported by a boss part 51a formed in the housing 51, through a bearing 59. That is, the small bevel gear 37 is supported thereby at locations of the front and rear end parts thereof.

The large bevel gear 38 is positioned on the right side of the small bevel gear 37, and it is fixed (or screwed) to an outer surface of the hollow shaft 61 which extends in the direction of the right and left of the vehicle, with respect to the centerline C. The large bevel gear 38 and the hollow shaft 61 are rotatably supported by the housing 51 and the right side cover 52 through bearings 62 which are arranged on the right and left sides of the large bevel gear 38. The hollow shaft 61 has an inner spline which engages with left and right output shafts 31 for the rear wheels 2. Each of the output shafts 31 projects from the housing 51 and the right side cover 52, in the direction of the right and left of the vehicle, respectively. Each of the outputs shafts 31 and 31 is connected to each of the drive shafts 33 and 33 for the rear wheels 2, through each of the constant velocity universal joints 32 and 32.

As aforementioned, the input shaft 35 of the final reduction gear 30, tilts rightwards forwards at the angle of θ1 (θ=11°) with respect to the centerline C. In compliance with this construction, the front and rear side surface walls of the braking device 50 are so formed that the angle of θ1 (θ=11°) forms between each of the front and rear side surface walls thereof and a plane (or surface) perpendicular to the centerline C, in the same direction as that of the input shaft 35.

The wet multiple-disk braking device 50 has a plurality of friction plates 64 which engage with an outer spline of the input shaft 35 so as to be able to move in the direction of the axis of the input shaft 35, a plurality of separators 66, which are mounted alternately with respect to the friction plates 66 in the direction of the axis, in which the separate plates 66 engage with an inner groove part 65 formed on an inner wall of the brake cover 53, movably in the direction of the axis, an annular pressure plate 67 which is mounted between the separate plate 66 at the front and a rear surface of the brake cover 53, a steel ball 68 of a cam mechanism for a braking operation, and so on.

The pressure plate 67 is rotatably supported by a boss part formed inside the brake cover 53. The pressure plate 67 has a plurality of wedge grooves which are formed circumferentially at equal interval on its front edge surface. Each of the wedge grooves 69 is formed so as to extend in a shape of an arc in the direction of circumference of the pressure plate 67, and is formed so that a depth becomes shallows in one direction of the circumference. The steel balls 68 which are mounted inside concave parts 70 formed on the rear surface of the brake cover 53, engage with the wedge grooves 69, respectively, forming the cam mechanism for braking operation.

The pressure plate 67 has a projection 67a on its outer surface, and the projection 67a engages with a brake operation lever 71 which is fixed to a lever shaft 72. The lever shaft 72 is rotatably supported by the brake cover 53 and the housing 51, and the lever shaft 72 projects forwards from the brake cover 53. The lever shaft 72 is interlocked with an unshown brake operation part, such as a brake operation pedal, a brake operation lever, and so on, via an operational force transmission mechanism, such as a wire transmission mechanism.

Namely, when the brake operation part is operated, and when the lever shaft 72 and the brake operation lever 71 are rotated, the pressure plate 67 is also rotated, from a state shown in FIG. 3, with the projection 67a. Then, the pressure plate 67 moves backwards on the basis of the cam action between the steel ball 68 and the wedge groove 69. At this time, all of the friction plates 64 and all of the separate plates 66, are pinched, under a pressure, between the pressure plate 67 and the front surface wall of the housing 51, so that the input shaft 35 is braked thereby.

(Cooling of Brake and Lubricant Device)

In the embodiment, as a device for cooling the wet multiple-disk braking device 50, a lubricant circulation system in which the lubricant housed in the final reduction gear chamber 56 and in the brake chamber 55 is circulated, is employed. Furthermore, in order to promote the heat radiation from the lubricant at a high temperature, the power transmission mechanism adopts a construction, by which a wind gained while the vehicle is running, and an air discharged from the automatic V-belt transmission, are used positively.

Figure 4:
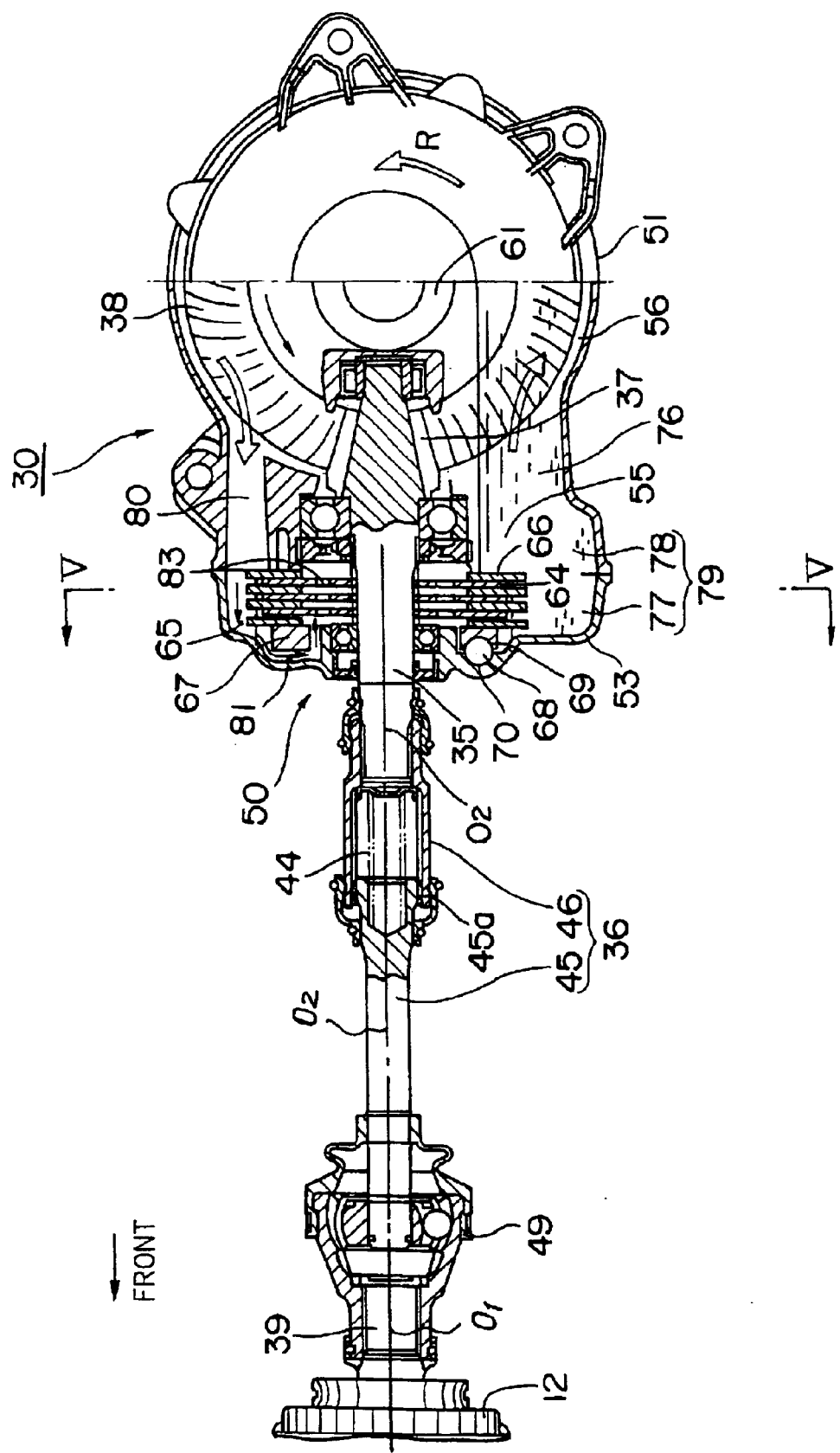
FIG. 4 is a cross sectional view taken approximately on a line corresponding with IV—IV in FIG. 3.

FIG. 4 is an enlarged view of a horizontal cross section generally taken on a line of IV—IV of FIG. 3, and the figure shows the final reduction gear 30 and the wet multiple-disk braking device 50. As shown in the figure, each of the friction plates 64 and separate plates 66, has an outer diameter which is smaller than the outer diameter of the large bevel gear 38. The brake cover 53 and the housing 51, have concave parts 77 and 78, at the bottom part, which extends in the direction of the width of the body of the vehicle (refer to FIG. 5). The concave parts 77 and 78 form an oil sump 79 having a large volume, for the lubricant, in a bottom part of the brake chamber 55. The oil sump 79 fluidically communicates with (or is connected to) a lower part of the final reduction gear chamber 56, via a lower oil passage 76.

On the other hand, the housing 51 has a rear part which is formed as a circular arc so as to surround an outer circumference of the large bevel gear 38 with a small gap therebetween, as shown in FIG. 4, to ensure a high ground clearance. Also, an upper inside of a front part of the housing 51, has an oil passage 80 which fluidically communicates with an upper inside of the final reduction gear chamber 56 and the upper inner circumferential groove part 65 of the brake chamber 55.

Also, there is provided an oil passage 81 which forms between a front surface of the pressure plate 67 and the rear surface of the front edge brake cover 53, in which the oil passage 81 communicates with a space inside the plurality of separate plates 66. A radially inwardly circumferential part of each of the friction plates 64, has a plurality of oil passage openings 83.

Figure 5:
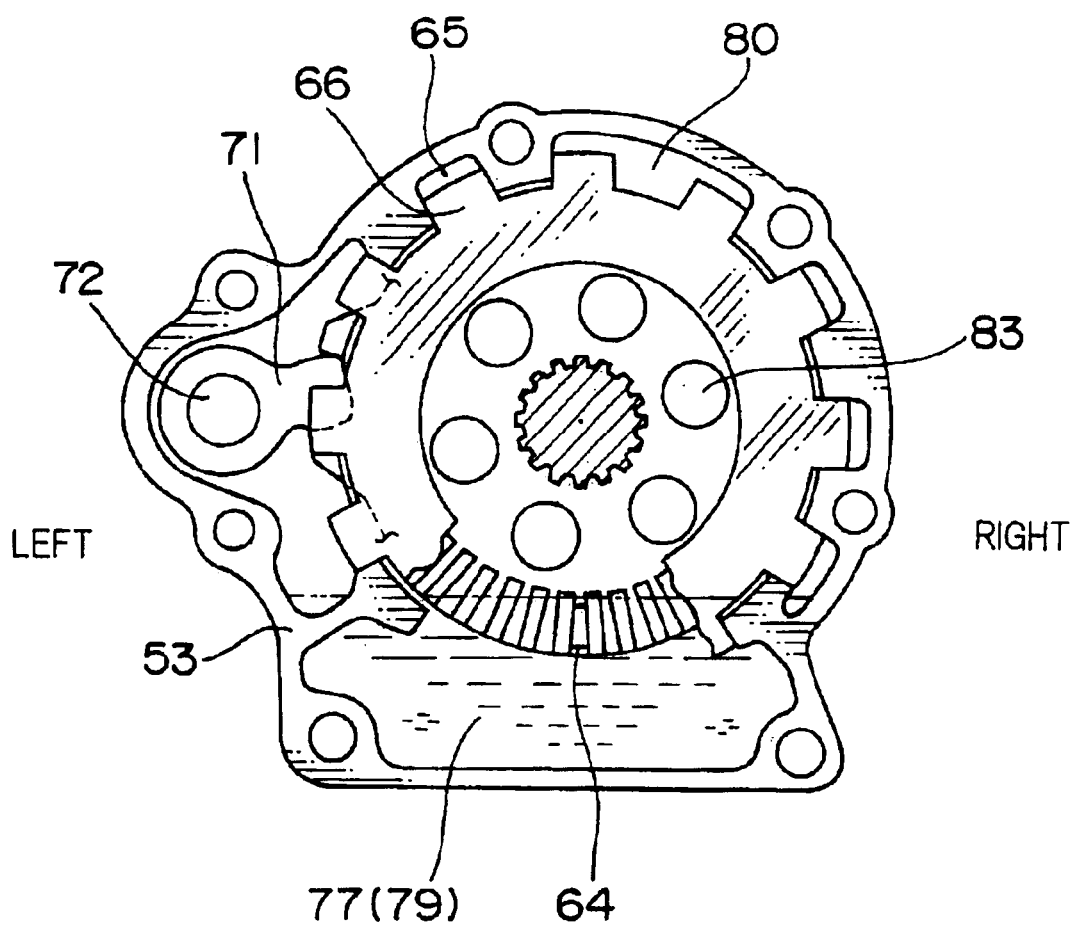
FIG. 5 is a cross sectional view taken approximately on a line corresponding with V—V in FIG. 4.
Figure 6:
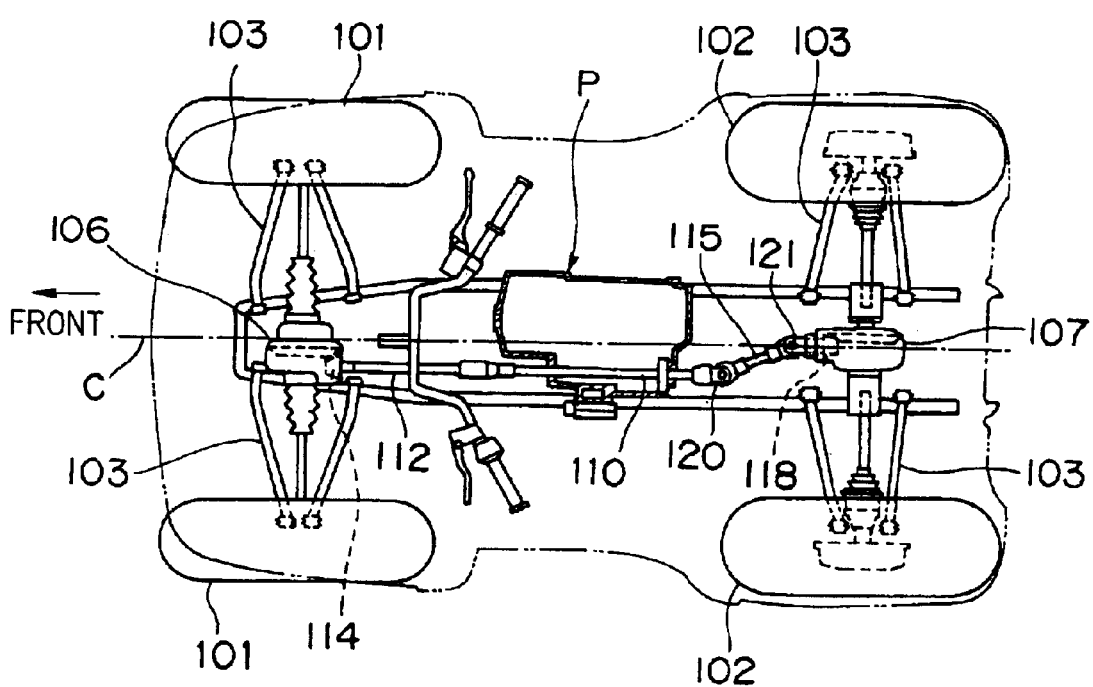
FIG. 6 is a plan view showing a four-wheel drive vehicle in which a power transmission mechanism according to prior art is mounted.

FIG. 5 is a cross sectional view taken approximately on a line corresponding with V—V in FIG. 4. As shown in the figure, the oil passage openings 83 are formed so as to penetrate the friction plate 64 in the direction of circumference at equal interval. Meanwhile, the oil sump 79 is formed larger in the direction of the width of the vehicle than in the direction of the centerline C of the vehicle, in which the oil sump 79 is secured to have a large volume for storing the lubricant, as explained above.

(Brake Cooling Device Making Use of Air Discharged from Automatic V-belt Transmission)

In FIG. 2, the air outlet hole 17 provided at the rear end of the belt cover 13, is connected to an air discharging guide 85. As shown in the figure, the air discharging guide 85 extends rearwards so as to ascend once to form an ascending part 85a, enters a space between the frames F, descends to form a descending part 85b, and extends up to a vicinity of the front portion of the brake cover 53 of the wet multiple-disk braking device 50 (refer to FIG. 3).

As shown in FIG. 3, a rear part of the air discharging guide (pipe) 85 extends diagonally leftward towards the rear of the vehicle, and a rear end part thereof is orientated and opened towards the brake cover 53. The rear end part of the air discharging guide 85 has a choke part 86 in order to increase the air discharging flow rate. Furthermore, there is provided a mixer tube 87 around the choke part 86, with a gap, or space, being formed radially circumferentially therebetween. The mixer tube 87 is in a shape of a taper, the radius of which decreases towards the rear of the vehicle body. Namely, the construction thereof forms an air ejector. Thereby, the amount of air is increased, and the temperature of the air is decreased to cool the braking device 50, effectively.

(Transmission of Drive Power for Moving Vehicle)

In FIG. 1, the drive power which is outputted from the crankshaft of the engine 10, is transmitted to the gear transmission 12 through the automatic V-belt transmission 11, and then the drive power is transmitted to the power takeoff shaft 39 from the output shaft 43 of the gear transmission 12 through the bevel gears 42 and 43.

The drive power is transmitted from the front part of the power takeoff shaft 39 to the front propeller shaft 26 for the front wheels 1 through the spline coupling 28. On the other hand, the drive power is transmitted from the rear part of the power takeoff shaft 39 to the rear propeller shaft 36 for the rear wheels 2 through a constant velocity universal coupling 40.

The drive power which is transmitted to the front propeller shaft 26, is reduced in rotational speed inside the differential gear 20. The drive power is, then, transmitted to both of the constant velocity universal joints 22, to both of the front wheel drive shafts 23, to both of the constant velocity universal joints 24, and to both of the front wheels 1.

Referring to FIG. 3, the drive power which is transmitted to the rear propeller shaft 36 in a posture of inclination as explained above, is transmitted to the input shaft 35 of the final reduction gear 30, through the spline coupling. Then, the drive power is changed in direction by the small bevel gear 37 and the large bevel gear 38, while the drive power is reduced in rotational speed, the drive power is transmitted to both of the output shafts 31 through the hollow shaft 61, and then the drive power is transmitted to both of the drive shafts 33 through both of the constant velocity universal couplings 32.

(Cooling of Brake)

In FIG. 4, the lubricant contained in the oil sump 79 on the bottom part of the wet multiple-disk wet braking device 50, is forced to be flowed upwards in the direction shown by an arrow "R" on the basis of rotation of the large bevel gear 38. The lubricant is then moved into the inner circumferential groove part 65 locating in the front part of the final reduction gear 30, through the oil passage 80 locating in the upside of the final reduction gear chamber 56, thus cooling down the radially outer circumferential part of the separate plates 66. Subsequently, the lubricant passes through the oil passage 81 locating forward of the pressure plate 67, to cool down the pressure plates 67. At the same time, the lubricant enters the radially inner circumferential part of the separate plates 66. Then, the lubricant cools down the friction plates 64 while passing through the oil passage openings 83 thereof, and then the lubricant returns back to the oil sump 79.

In this way, the lubricant circulates through the whole space of the final reduction gear chamber 56 and the brake chamber 55. Therefore, with the construction, a large radiation area for releasing any heat generated in the final reduction gear 30 and the wet multiple-disk braking device 50, is surely secured, and the cooling of the braking device is enhanced thereby. Also, according to the construction, the oil sump 79 is positioned in the brake chamber 55 which locates in front of the final reduction gear 30. Therefore, the lubricant stored in the brake chamber 55, and the lubricant stored in the oil sump 79, are effectively cooled down by the air, or wind, blown from front while the vehicle is running.

Furthermore, with reference to FIGS. 1 to 3, the air discharged from the belt cover 13 is discharged through the air discharging guide (or pipe) 85 and the mixer tube 87 towards the front edge brake cover 53 with the outside air sucked by the mixer tube 87. Therefore, the heat radiation effect (or heat liberation effect) is further promoted.

Furthermore, as aforementioned, the brake cover 53 tilts with respect to the surface (or plane) M which is perpendicular to the centerline C of the vehicle. Therefore, the air blown from front of the vehicle during its running, flows smoothly along the front surface of the brake cover 53 from the left to the right thereof, so that the heat radiation effect is further enhanced.

As aforementioned, the air discharging guide 85 has a vertically ascending (or rising) part, as shown in FIG. 2, between the air outlet hole 17 of the belt cover 13 and the choke part 86. Therefore, with the construction, water is effectively prevented from entering the belt cover 13 from the choke part 86, through the air discharging guide 85.

Although the present invention has been fully described in connection with the preferred embodiment thereof with reference to the accompanying drawings, it is to be noted that various other changes and modifications are also apparent to those skilled in the art.

For example, the power transmission mechanism according to the present invention, is not limited to the application to the all-terrain four-wheel drive vehicle, and the same mechanism according thereto can apply to other types of four-wheel drive vehicles.

Also, the power transmission mechanism according to the present invention, can apply to a four-wheel drive vehicle which has a mechanism for switching a two-wheel drive and a four-wheel drive.

Such changes and modifications are also to be understood as included within the scope of the present invention as defined by the appended claims unless they depart therefrom.

What is claimed is:

1. A power transmission mechanism of a four-wheel drive vehicle, comprising:

a power unit which has an engine and a transmission, in which the power unit is provided between front wheels and rear wheels of the vehicle;

a power takeoff shaft of the transmission, in which the power takeoff shaft is provided generally in parallel and in offset with a centerline relative to a width of a body of the vehicle;

a differential gear for the front wheels, in which the differential gear is provided centrally relative to the width of the body, and in which the differential gear has an input shaft provided in parallel with the centerline and provided coaxially with the power takeoff shaft;

a front propeller shaft for connecting between a front part of the power takeoff shaft and a rear part of the input shaft of the differential gear;

a final reduction gear for the rear wheels, in which the final reduction gear is provided centrally relative to the width of the body of the vehicle, in which the final reduction gear has an input shaft provided such that a front part of the input shaft tilts toward the power takeoff shaft with respect to the centerline; and a rear propeller shaft for connecting between a rear part of the power takeoff shaft and the front part of the input shaft of the final reduction gear, wherein the front propeller shaft is arranged so as to be coaxial with the power takeoff shaft and the input shaft of the differential gear, and wherein the rear propeller shaft is arranged so as to be coaxial with the input shaft of the final reduction gear.

2. The power transmission mechanism as claimed in claim 1, wherein the power unit is provided between the front wheels and the rear wheels such that a total length of the rear propeller shaft and the input shaft for the final reduction gear is longer than a total length of the front propeller shaft and the input shaft for the differential gear.

3. The power transmission mechanism as claimed in claim 1, wherein there is further provided a braking device which is mounted on the input shaft of the final reduction gear.

4. The power transmission mechanism as claimed in claim 3, wherein the braking device is a wet multiple-disk braking device.

5. The power transmission mechanism as claimed in claim 4, wherein the wet multiple-disk braking device has a casing which is integrated with a casing which the final reduction gear has.

6. The power transmission mechanism as claimed in claim 3, wherein the rear propeller shaft is longer than the front propeller shaft.

\* \* \* \* \*